(12) United States Patent
Sakaguchi

(10) Patent No.: US 7,122,782 B2
(45) Date of Patent: Oct. 17, 2006

(54) MULTI-OPTICAL AXIS PHOTOELECTRIC SENSOR

(75) Inventor: Tomikazu Sakaguchi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 10/759,186

(22) Filed: Jan. 20, 2004

(65) Prior Publication Data

US 2004/0159778 A1 Aug. 19, 2004

(30) Foreign Application Priority Data

Jan. 20, 2003 (JP) .......................... P. 2003-010825

(51) Int. Cl.
*G01V 9/04* (2006.01)
(52) U.S. Cl. .................. 250/222.1; 340/555; 250/221
(58) Field of Classification Search ............... 250/221, 250/239, 222.1; 340/555–557
See application file for complete search history.

(56) References Cited

U.S. PATENT DOCUMENTS 3,805,061 A * 4/1974 De Missimy ............ 250/208.3
5,003,169 A 3/1991 Sakaguchi et al.
6,635,862 B1 * 10/2003 Shteynberg ................. 250/221
2002/0017604 A1 2/2002 Nakazaki et al.

FOREIGN PATENT DOCUMENTS

JP 2000-251595 A 9/2000
JP 2001-135208 A 5/2001

* cited by examiner

Primary Examiner—Thanh X. Luu
Assistant Examiner—Tony Ko
(74) Attorney, Agent, or Firm—Smith Patent Office

(57) ABSTRACT

A multi-optical axis photoelectric sensor where a main element holder and an additional element holder are relatively moved in a direction perpendicular to an arrangement direction of optical axes. An engagement projection of the additional element holder is fit into a receiving hole of the main element holder and the hook of the additional element holder engages with the end edge of the main element holder, whereby the main element holder and the additional element holder are mechanically coupled to each other.

19 Claims, 17 Drawing Sheets

MULTI-OPTICAL AXIS PHOTOELECTRIC SENSOR

BACKGROUND OF THE INVENTION

1. Field of the Invention

The present invention relates to a multi-optical axis photoelectric sensor configured by light projecting and receiving units each of which is formed by disposing a plurality of optical elements in a line.

2. Description of the Related Art

For example, a multi-optical axis photoelectric sensor is used in order to form a safety light curtain around a press machine. The multi-optical axis photoelectric sensor is configured by a light projecting unit and a light receiving unit each of which is formed by disposing a plurality of optical elements in a line. The light projecting unit and the light receiving unit are disposed opposite to each other so that light beams projected from respective light projecting elements of the light projecting unit are received by the corresponding light receiving elements of the light receiving unit, respectively. For example, when a worker shields a part of the light curtain, a light shielding signal is outputted from the multi-optical axis photoelectric sensor, whereby the press machine is immediately stopped during its operation.

A multi-optical axis photoelectric sensor disclosed in JP-A-2000-251595 is arranged in a manner that a circuit board is disposed at the rear surface of the optical elements, and a screw is inserted into a first hole formed in an optical block and also into a second hole formed in a casing corresponding to the first hole to thereby perform relative positioning between the casing and the optical block. Two sets each formed by the optical block and the circuit board disposed at the rear surface thereof are housed within the casing and these two circuit boards are electrically coupled by a flat cable.

A multi-optical axis photoelectric sensor disclosed in JP-A-2001-135208 is arranged in a manner that a board housed within a casing is formed by laminating a base board and a photoelectric element board. Further, a circuit to be coupled to the respective optical elements and on which the optical elements are disposed in a line is printed on the photoelectric element board. Resistors, capacitors and transistors are mounted on one surface of the base board which is opposite to the other surface facing on the photoelectric element board. In the photoelectric element board, two positioning holes are formed so as to be separated from each other. Further, two bosses capable of being inserted into these two positioning holes are formed in the optical block, whereby the bosses and the positioning holes perform the relative positioning between the optical block and the photoelectric element board. A first hole for positioning with respect to the casing is formed in the optical block and a second hole corresponding to the first hole is formed in the casing, whereby a screw is inserted into the first and second holes to thereby perform the relative positioning between the optical block and the casing.

According to the inventions disclosed in the aforesaid publications, the multi-optical axis photoelectric sensor having many optical axes can be formed by providing plural units each formed by the optical block and the photoelectric element board disposed at the rear surface thereof. However, a pitch between the end optical axis of one of the units and the end optical axis of another of the units varies depending on where the screw is fastened. It is important for the multi-optical axis photoelectric sensor to keep the distance (pitch) between the respective adjacent optical axes constant. In particular, when the pitch is set to be as short as possible in order to enhance the detection ability, it is important to keep the pitch constant.

SUMMARY OF THE INVENTION

Accordingly, an object of the invention is to provide a multi-optical axis photoelectric sensor which can easily keep a pitch constant between respective adjacent optical elements contained within the multi-optical axis photoelectric sensor.

According to the invention, the aforesaid object is attained by providing the multi-optical axis photoelectric sensor comprising:

a main element holder including a plurality of light guide housings, which are disposed in a line with a same interval and into each of which an optical element is fit, the main element holder having an engagement portion; and an additional element holder including a plurality of light guide housings, which are disposed in a line with a same interval and into each of which an optical element is fit, the additional element holder having an engagement portion capable of mechanically engaging and disengaging the engagement portion of the main element holder, wherein the main element holder and the additional element holder are positioned in a state that the plurality of the light guide housings of the additional element holder and the plurality of the light guide housings of the main element holder are disposed in a line when the additional element holder is engaged with the main element holder by the engagement portions of the additional element holder and the main element holder.

That is, according to the invention, the main element holder and the additional element holder are mechanically coupled to each other while securing the relative positioning between the main element holder and the additional element holder by means of the engagement portions. Therefore, the pitch between the optical element at the end portion of the main element holder and the adjacent optical element at the end portion of the additional element holder is constant. Various types can be considered as the engagement portion which can secure such a relative positioning. In contrast, so long as each of the main element holder and the additional element holder is formed by a resin mold member, it is easy to form the engagement portions with a high accuracy, and the optical elements contained in the main element holder and the additional element holder are placed in a state of being disposed in a line with the same interval after the main element holder and the additional element holder are engaged with each other.

When the aforesaid engagement portion is formed at each of the one end and the other end of the additional element holder, a plurality of the additional element holders can be mechanically coupled to each other, and the number of optical axes can be increased by increasing the number of the additional element holders.

DETAILED DESCRIPTION OF THE INVENTION

In the preferred embodiment of the invention, when the optical element is configured in an arbitrary shape by using resin and the coupling terminal of the optical element is configured to extend backward from the rear surface thereof, for example, it is preferable to dispose a circuit board along the rear surfaces of the main element holder and the additional element holder and to couple the coupling terminals of the optical elements to the circuit board. This circuit board is preferably separated into a circuit board adjacent to the main element holder and an additional circuit board adjacent to the additional element holder.

When the coupling terminal of the optical element is configured to extend outward from the side surface thereof, it is preferable to dispose the circuit board along the induction tubes of the main element holder and the additional element holder and to couple the coupling terminals of the optical elements to the circuit board. This circuit board is also preferably separated into a circuit board adjacent to the main element holder and an additional circuit board adjacent to the additional element holder.

It is preferable to prepare a control board including a control circuit etc. in addition to the circuit board to which the optical elements are coupled and to dispose the control board adjacent to the main element holder.

The circuit board, the control board and the additional circuit board are preferably engaged mechanically by using hooks, for example, in a state where these boards are positioned in the main element holder and the additional element holder. Thus, the main element holder and the additional element holders can be housed within a casing in a state where the circuit board etc. are assembled to the element holder and also in a state where the additional element holders are coupled to each other, whereby the assembling procedure of the multi-optical axis photoelectric sensor can be facilitated.

[EMBODIMENTS]

Figure 1:
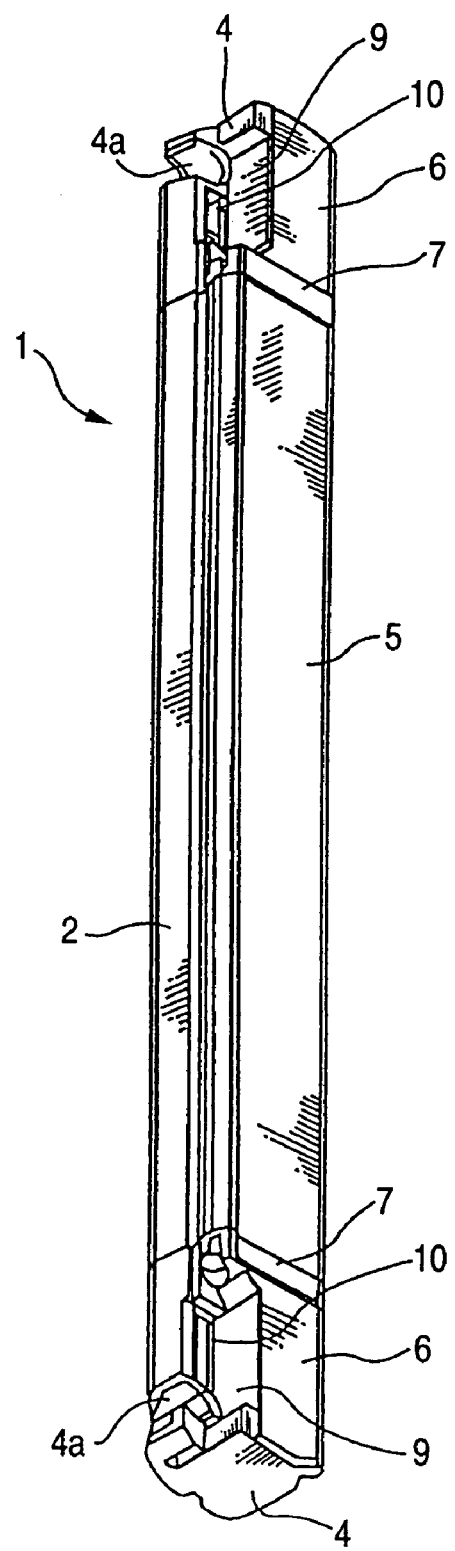
FIG. 1 is a perspective view for explaining the outer appearance of a multi-optical axis photoelectric sensor according to an embodiment of the invention;.

FIG. 1 is a perspective view of the multi-optical axis photoelectric sensor according to an embodiment of the invention. In the multi-optical axis photoelectric sensor 1, each of a light projecting unit and a light receiving unit has the same configuration. Thus, the multi-optical axis photoelectric sensor 1 will be explained in relation to each of the light projecting unit and the light receiving unit. In particular, when explaining the technical matters relating to the light projecting unit or the light receiving unit, the technical matters will be explained with respect to the light projecting unit or the light receiving unit.

Figure 2:
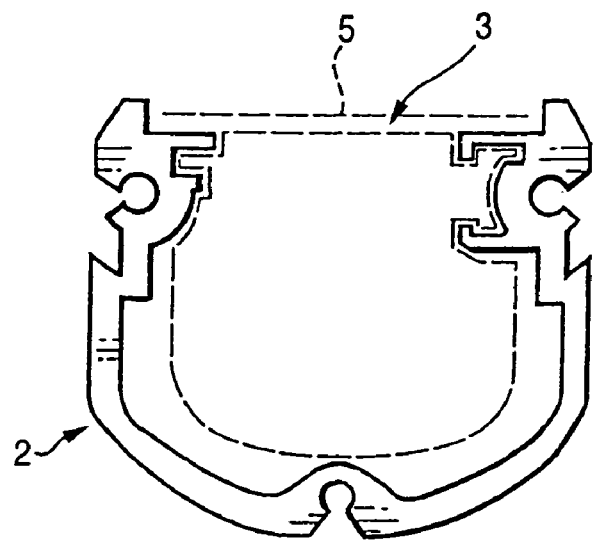
FIG. 2 is a sectional view of the configuration of a case main body which is an extrusion mold member of the multi-optical axis photoelectric sensor according to the embodiment.

The multi-optical axis photoelectric sensor 1 has an elongated case main body 2 made of aluminum and formed by an extrusion mold member. The case main body 2 has an almost U-shape in its section which is opened at both ends and its front surface (see FIG. 2). The case main body is small in its occupation area and slim as compared with the related-art devices. The opened front surface of the case main body 2 constitutes a window 3 (see FIG. 2) for light projection and light reception which extends continuously in the longitudinal direction.

An end member 4, which is a mold member formed by metal such Zn alloy or plastics, is attached to each of the ends of the case main body 2. A pair of end members 4 and the case main body 2 constitute the outer contour of the multi-optical axis photoelectric sensor 1. A window for projecting and receiving light is formed at the front surface of each of the end members 4. That is, in the multi-optical axis photoelectric sensor 1, the optical elements are housed not only within the case main body 2 but also within the end members 4, whereby the optical axes of the multi-optical axis photoelectric sensor 1 are disposed in a line with the same interval (a pitch of 20 mm) from the closed end of one of the end members 4 to the closed end of the other of the end members 4.

A front cover adhered to the front surface of the multi-optical axis photoelectric sensor 1 through adhesive is constituted by a first front cover 5 covering the front surface of the case main body 2 and second front covers 6 covering the front surfaces of the end members 4. A transverse member 7 made of metal is attached at each of the boundaries between the first front cover 5 and the second front covers 6. The transverse member 7 pushes the end edges of the first and second front covers 5 and 6, whereby the first and second front covers 5 and 6 are made in contact with pressure to the case main body 2 and the end members 4.

In this manner, the casing of the multi-optical axis photoelectric sensor 1 is divided into the three parts 2, 4, 4 and the front cover is divided into the three parts 5, 6, 6 in correspondence therewith. Thus, as compared with the multi-optical axis photoelectric sensor configured by a single front cover, the multi-optical axis photoelectric sensor according to the embodiment can make the entire length of the front cover shorter, whereby the degree of influence due to the difference of thermal expansion between the sensor casing (in particular, the case main body 2) and the front cover can be reduced.

Figure 3:
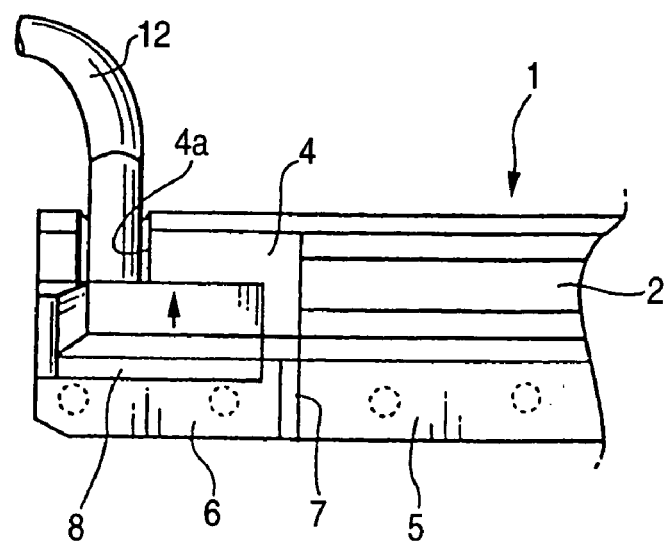
FIG. 3 is a partial diagram for explaining a state where an external connector is coupled with an internal connector provided at the end portion of the multi-optical axis photoelectric sensor according to the embodiment.

The end member 4 has such an outer configuration that a part of the front surface side thereof is notched so as not to interfere with the optical axis. This partial notch forms a notched portion 9 for disposing an external connector 8 (see FIG. 3) therein. When the external connector 8 is attached, the external connector buries the notched portion 9 of the end member 4 and is integrated with the end member 4 thereby to form a sectional shape common to that of the case main body 2.

The end member 4 has an insertion port 10 capable of receiving the external connector 8 (see FIG. 1). The insertion port 10 is opened toward the front surface side and an inner connector is disposed so as to face the insertion port 10. When the external connector 8 is moved toward the rear surface side from the front surface side along the optical axis and inserted into the insertion port 10, the external connector 8 can be coupled to the inner connector. A cable 12 extending from the external connector 8 can be extended to the rear surface side of the multi-optical axis photoelectric sensor 1 through a notched portion 4a traversing the end member 4 (see FIG. 3).

Figure 4:
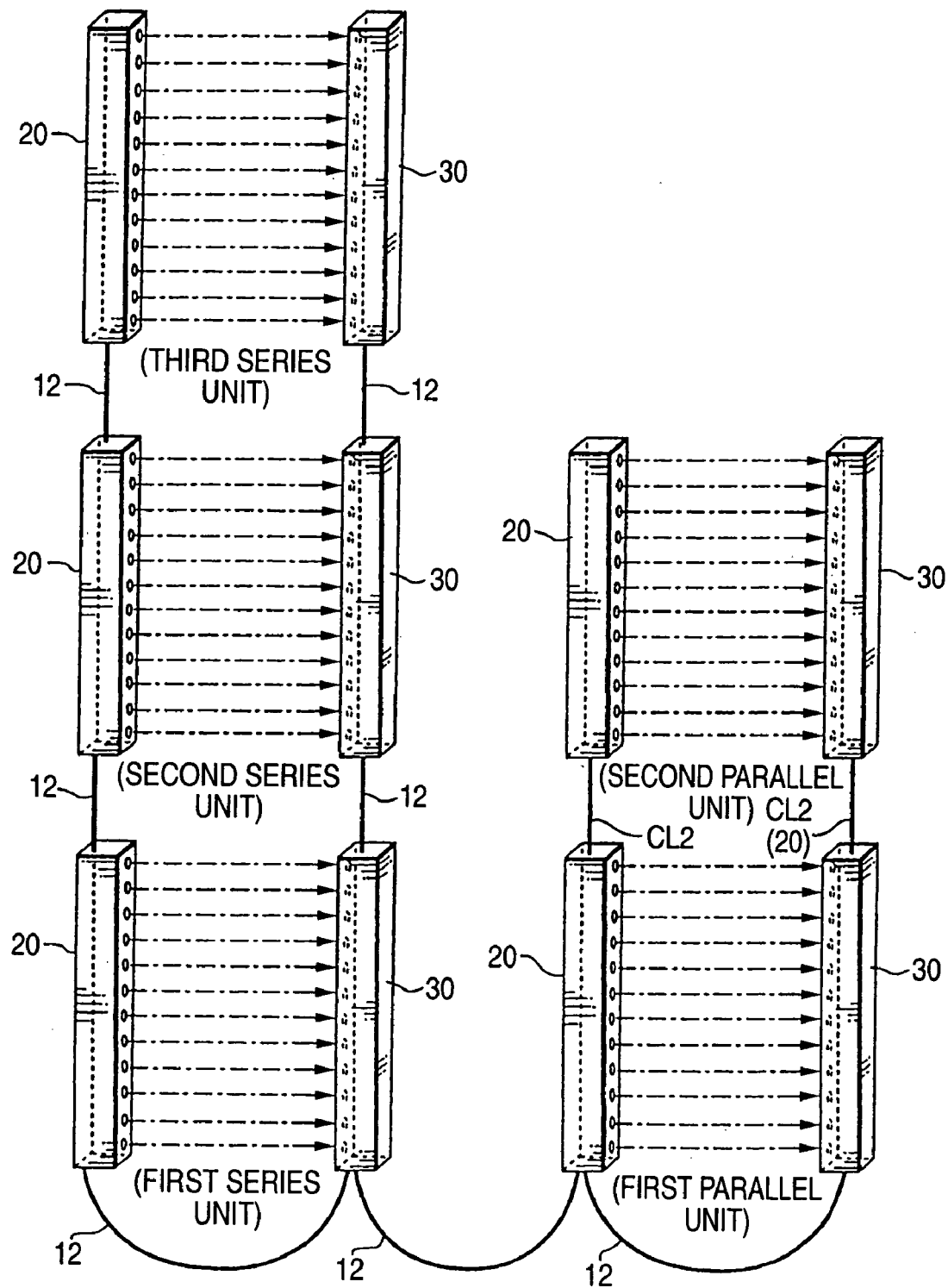
FIG. 4 is a diagram for explaining as an example that the multi-optical axis photoelectric sensors according to the embodiment can be coupled in series and parallel to each other.

The cable 12 supplies electric power to the multi-optical axis photoelectric sensor 1. Further, as shown in FIG. 4, it is possible to couple plural pairs of light projecting units 20 and light receiving units 30 in parallel or in series by using the cables 12 thereby to form a light curtain of a wide range. Since the respective adjacent ones of the multi-optical axis photoelectric sensors 1 (each includes the light projecting unit 20 and the light receiving unit 30) are coupled by the flexible cables 12 to each other, the bending angle between the adjacent multi-optical axis photoelectric sensors 1 is arbitrary. In addition, since the flexible cable 12 extends to the rear surface side from the notched portion 4a, in other words, the flexible cable 12 does not extend outward in the longitudinal direction from the end portion of the multi-optical axis photoelectric sensor 1, the multi-optical axis photoelectric sensors are not interfered by the flexible cables 12 at the time of disposing the adjacent multi-optical axis photoelectric sensors 1 in a closed state.

The number of the optical elements (the light projecting elements and the light receiving elements) contained within the multi-optical axis photoelectric sensor 1 shown in the figure and the distance (pitch) between the adjacent optical elements can be set arbitrarily. In the example shown in the figures, the pitch is 20 mm, and the multi-optical axis photoelectric sensor may be provided with 8 optical axes, 12 optical axes, 16 optical axes, 20 optical axes or the like, that is, up to 64 optical axes with the 64 optical elements at the maximum for example, on an arbitrary number of the optical elements unit basis by providing the case main bodies 2 with different sizes.

Figure 5:
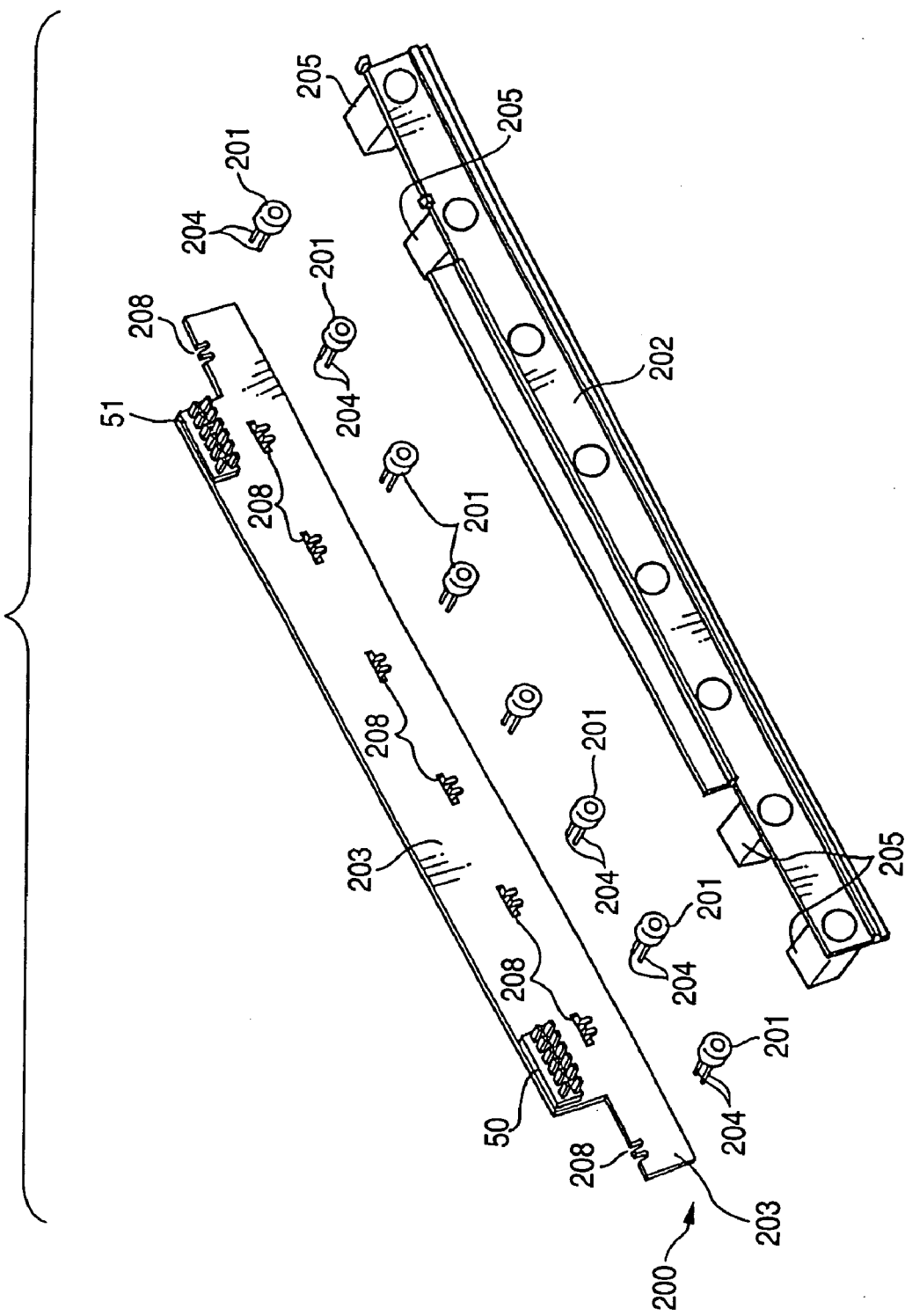
FIG. 5 is an exploded perspective view for explaining the basic inner unit of a light projecting unit.

As shown in FIG. 5, the basic inner unit 200 of the light projecting unit 20 includes light projecting elements 201, a main element holder 202 and a light projecting main board 203.

Figure 6:
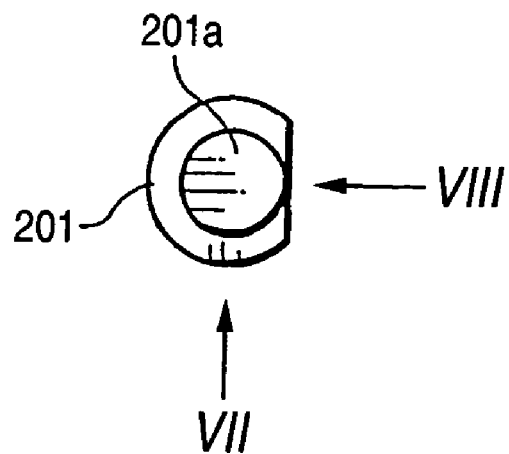
FIG. 6 is a front view of a light projecting element which outer configuration is formed by resin.
Figure 7:
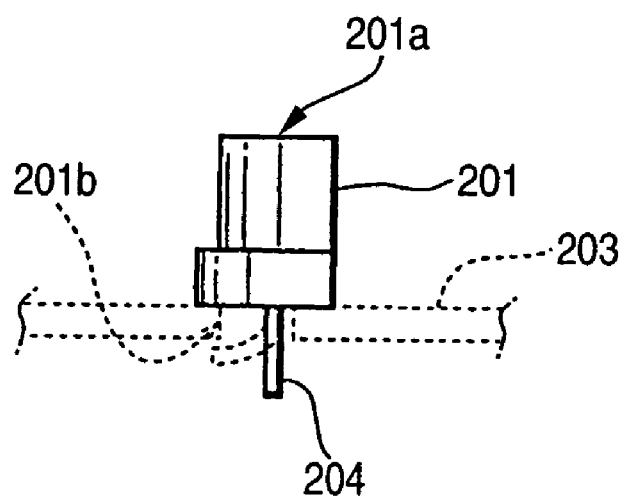
FIG. 7 is a side view of the light projecting element seen from an arrow VII direction in FIG. 6.
Figure 8:
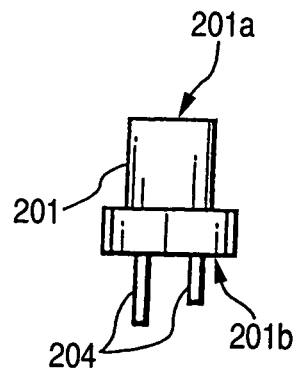
FIG. 8 is a side view of the light projecting element seen from an arrow VIII direction in FIG. 6.
Figure 9:
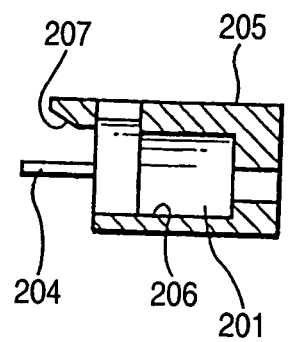
FIG. 9 is a sectional view for explaining a state that the light projecting element is fit into and hooked with a hole formed at the rear end of each of the induction light tubes of the element holder of the light projecting unit.
Figure 10:
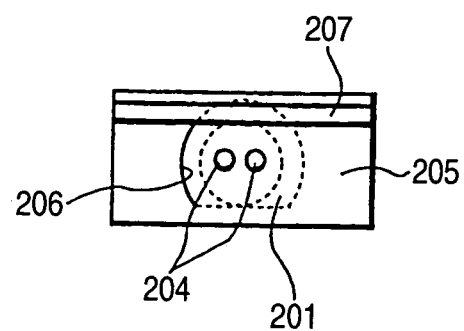
FIG. 10 is a rear view for explaining the light projecting element engaged by a hook formed at the rear end of each of the induction light tubes of the element holder of the light projecting unit.

As shown in FIGS. 6 to 8, each of the light projecting elements 201 has such an outer configuration that a part of the peripheral surface of the cylindrical shape thereof is notched to form a flat surface, and two coupling terminals 204 are provided at a surface 201b thereof which is at the opposite side of a light projecting surface 201a thereof for projecting light.

The main element holder 202 for projecting light is a resin mold member having eight light guide housings 205 disposed in a line with the same interval, and a lens plate (not shown) is disposed at the front surface thereof. Each of the light guide housings 205 is provided at the rear end surface thereof with a hole 206 in which the corresponding light projecting element 201 is fit and also provided with a hook 207 to be engaged with a part of the rear end surface of the corresponding light projecting element 201.

As understood from FIG. 5, the light projecting main board 203 has a length substantially the same as that of the main element holder 202. The light projecting main board 203 is disposed so as to oppose to the rear end surfaces of the light guide housings 205. At the light projecting main board 203, eight through holes or notches 208 through each of which the two coupling terminals 204 of the corresponding light projecting element 201 can pass are formed in a line with the same interval.

The light projecting element 201 attached to the corresponding one of the light guide housings 205 of the main element holder 202 is arranged in a manner that the two coupling terminals 204 thereof pass through the though holes or notches 208 and protrude from the rear surface of the light projecting main board 203. As shown in FIG. 7, the protrusion ends of the coupling terminals 204 are bent and soldered at the circuit of the light projecting main board 203.

Figure 11:
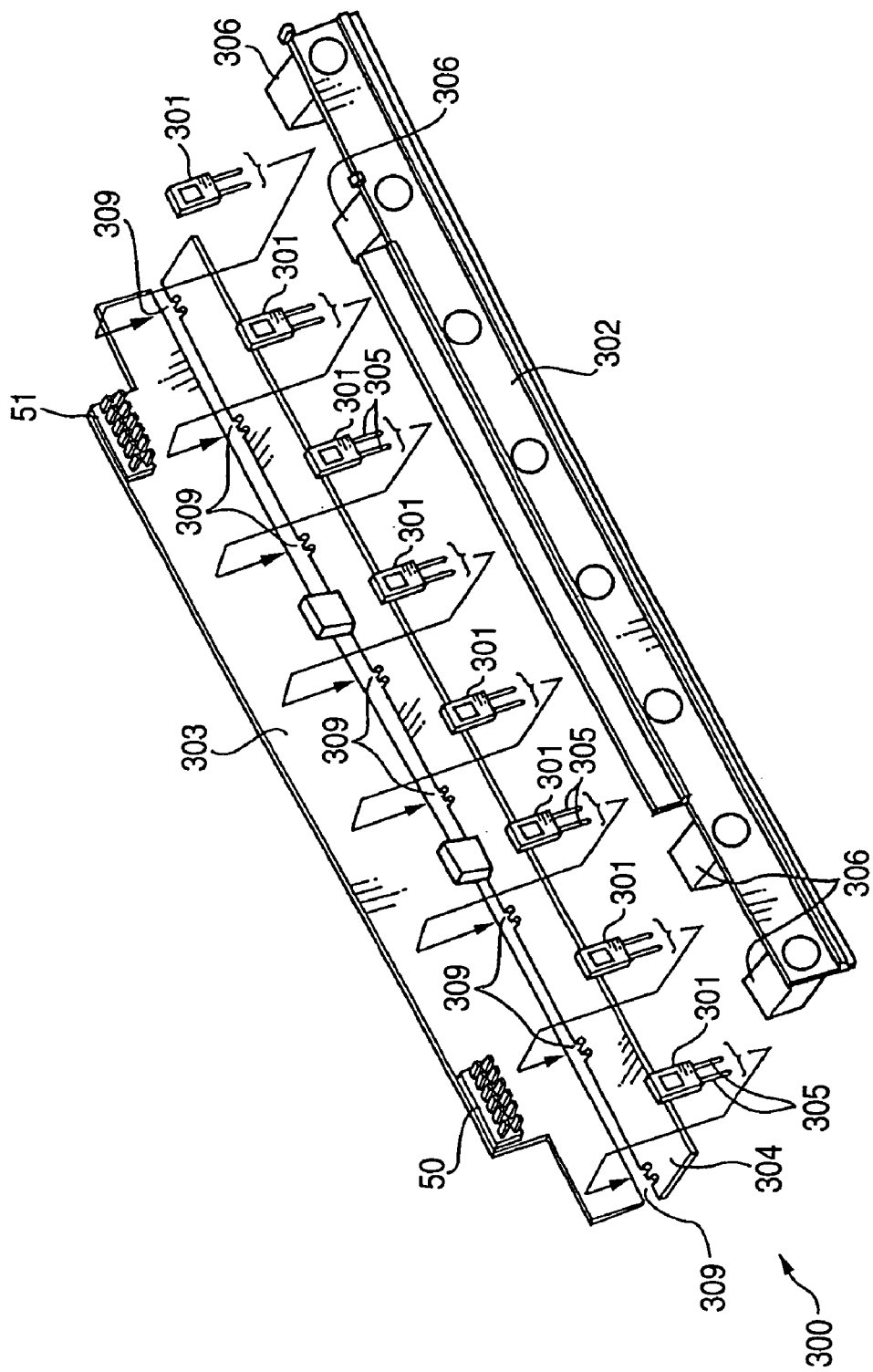
FIG. 11 is an exploded perspective view for explaining the basic inner unit of a light receiving unit.

As shown in FIG. 11, the basic inner unit 300 of the light receiving unit 30 includes light receiving elements 301, a main element holder 302, a light receiving control board 303 and a light receiving amplifier board 304.

Figure 12:
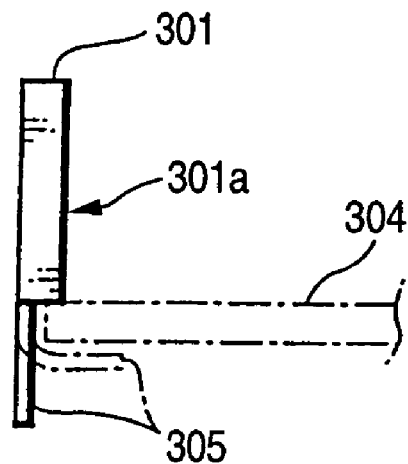
FIG. 12 is a side view of a light receiving element which outer configuration is formed by resin.
Figure 13:
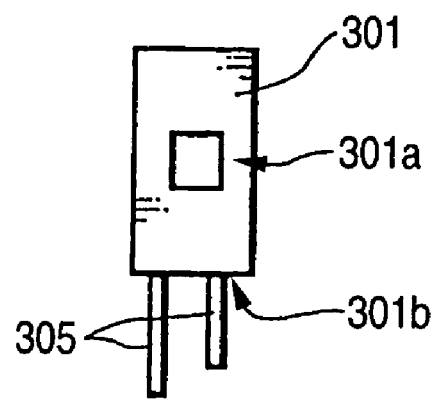
FIG. 13 is a front view of the light receiving element.

As shown in FIGS. 12 and 13, each of the light receiving elements 301 has a relatively-flat rectangular parallelopiped outer configuration and is provided with two coupling terminals 305 at an end surface 301b which is perpendicular to a light receiving surface 301a.

A light receiving main element holder 302 is a resin mold member having eight light guide housings 306 which are disposed in a line with the same interval. A lens plate (not shown) is disposed at the front surface of the main element holder. As understood from FIG. 14, each of the light guide housings 306 is provided at the rear end surface thereof with a hole 307 in which the corresponding light receiving element 301 is fit and also provided with a pair of retaining members 308 (FIGS. 14 and 15) which engage with the upper end edge and the lower end edge of the rear end surface of the light receiving element 301, respectively.

As understood from FIG. 11, the light receiving control board 303 and the light receiving amplifier board 304 each having substantially the same length as the main element holder 302 are disposed to be perpendicular to each other. That is, the light receiving control board 303 is disposed so as to oppose the rear end surfaces of the light guide housings 306 and the light receiving amplifier board 304 is disposed in parallel to the light guide housings 306. At the light receiving amplifier board 304, eight notches 309 through each of which the two coupling terminals 305 of the corresponding light receiving element 301 can pass are formed with the same interval along the rear side edge thereof.

Figure 14:
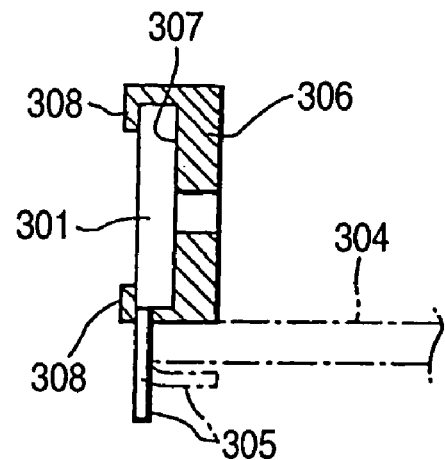
FIG. 14 is a sectional view for explaining a state that the light receiving element is fit into and engaged by a retaining member with a hole formed at the rear end of each of the induction light tubes of the element holder of the light receiving unit.
Figure 15:
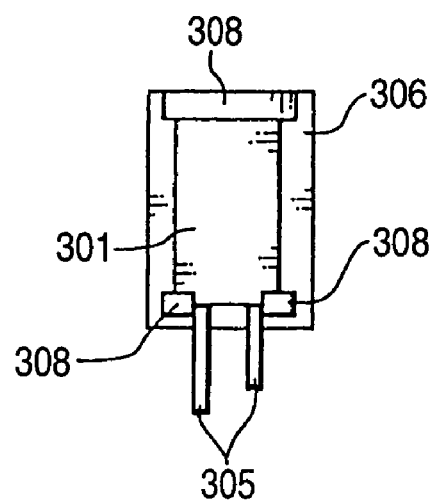
FIG. 15 is a rear view for explaining the light receiving element engaged by a retaining member formed at the rear end of each of the induction light tubes of the element holder of the light receiving unit.

Each of the light receiving elements 301 respectively attached to the rear end surfaces of the light guide housings 306 of the main element holder 302 is arranged in a manner that the two coupling terminals 305 thereof pass through the notches 309 and protrude from the lower surface of the light receiving amplifier board 304. As shown in FIGS. 12 and 14, the protrusion ends of the coupling terminals 305 are bent and soldered at the circuit of the light receiving amplifier board 304.

The multi-optical axis photoelectric sensor 1 can be provided with a desired number of the optical axes by mechanically coupling additional units to the aforesaid basic unit. The additional unit is formed by an additional element holder and a board.

Figure 16:
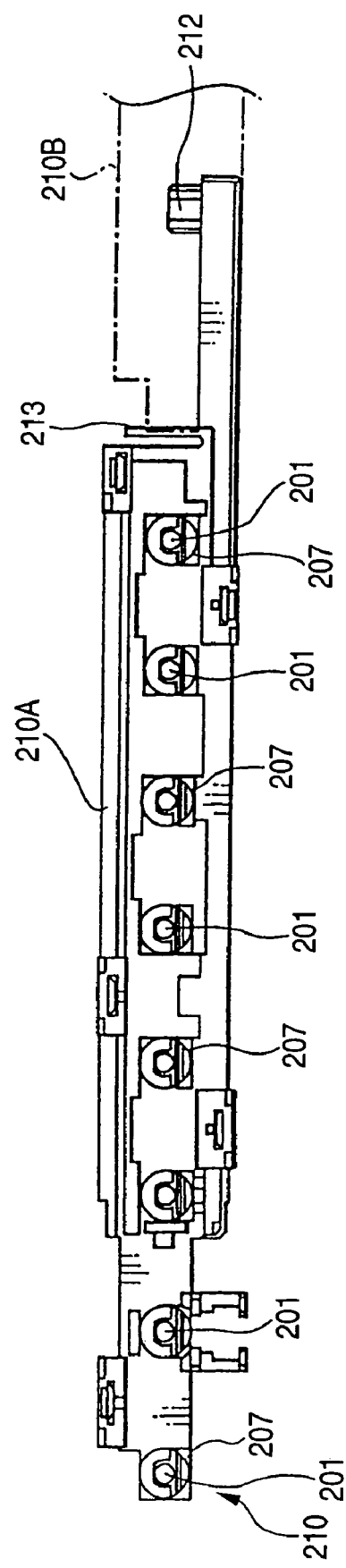
FIG. 16 is a rear view of the additional element holder of the light projecting unit.
Figure 17:
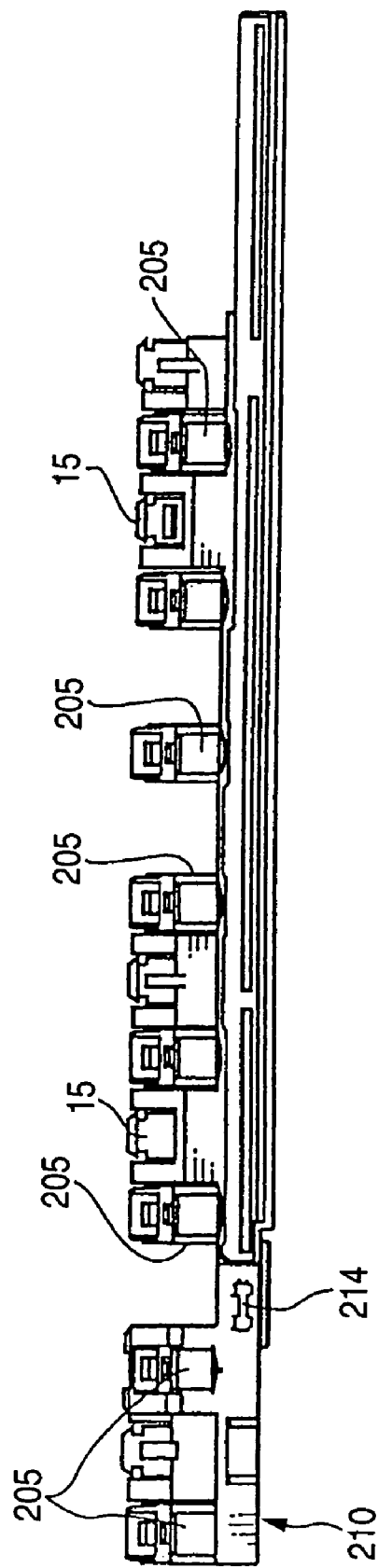
FIG. 17 is a side view of the additional element holder of the light projecting unit.

FIGS. 16 and 17 show an additional element holder 210 for the light projecting unit 20. FIG. 16 is a diagram showing the rear surface of the additional element holder 210. The additional element holder 210 has eight light guide housings 205. The structure of each of the light guide housings 205 is the same as that of the main element holder 202. That is, each of the light guide housings 205 is provided at the rear end surface thereof with a hole in which the corresponding light projecting element 201 is fit and also provided with a hook 207 to be engaged with a part of the rear end surface of the corresponding light projecting element 201.

The additional element holder 210 has, at its one end, an engagement projection 212 protruding in a direction perpendicular to the extending direction (the optical axis direction) of the light guide housing 205 and a hook 213, and further has, at its the other end, a receiving hole 214 extending in the direction perpendicular to the extending direction (the optical axis direction) of the light guide housing 205 (see FIG. 17).

With reference to FIG. 16, two additional element holders 210A and 210B are prepared. In order to combine the one end of the one additional element holder 210A with the other end of the other additional element holder 210B, the engagement projection 212 of the one additional element holder 210A is fit into the receiving hole 214 of the other additional element holder 210B, whereby the two additional element holders 210A and 210B are mechanically coupled. Then, when the engagement projection 212 is fit into the receiving hole 214, the hook 213 engages with the corner portion of the other additional element holder 210B.

Although FIGS. 16 and 17 relate to the light projecting unit 20, additional element holders with substantially the same structure as those of the light projecting unit are prepared for the light receiving unit 30, whereby the light receiving unit 30 can also increase the number of the optical axes on eight optical-axes unit basis by using the additional element holders.

Figure 18:
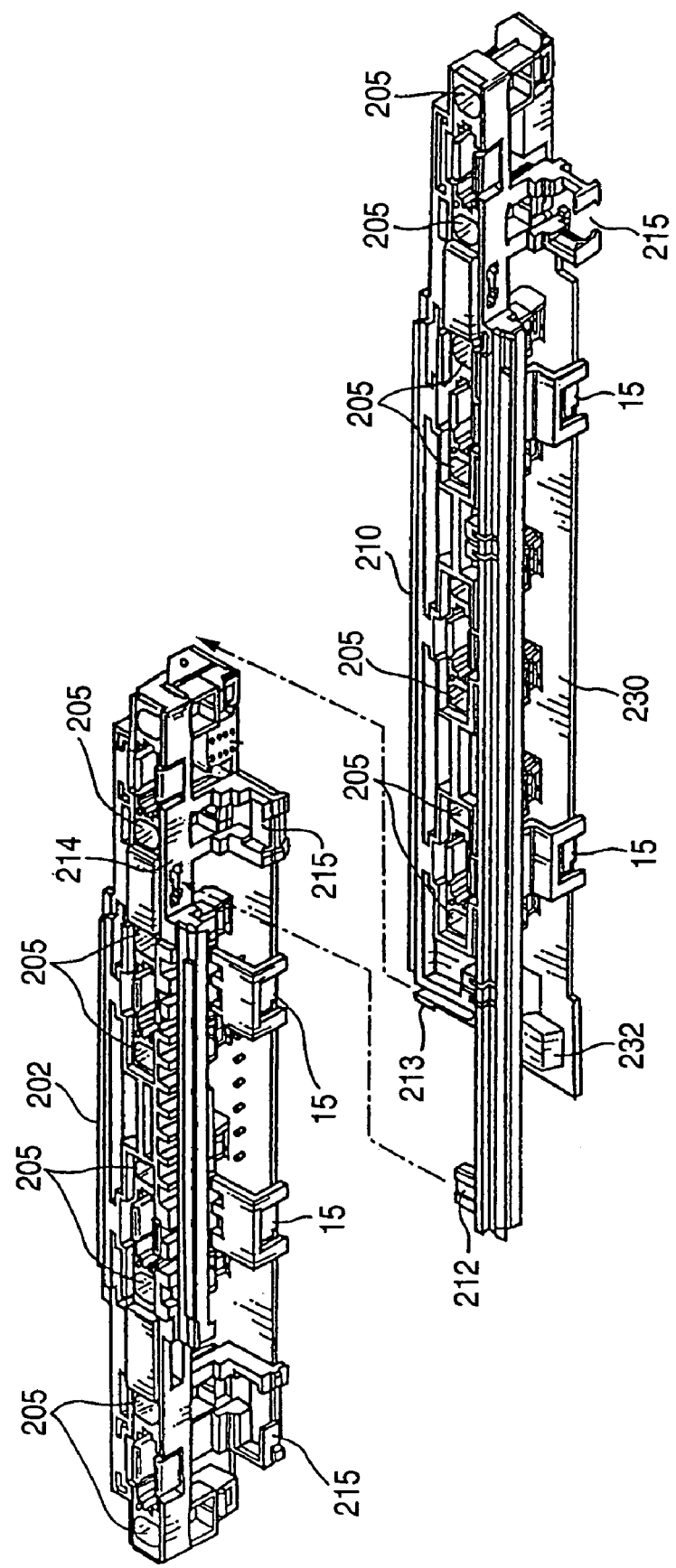
FIG. 18 is a diagram showing a process of coupling an additional unit formed by an additional element holder and a light projecting additional board disposed at the rear surface thereof with a basic unit formed by a main element holder of the light projecting unit and a light projecting main board disposed at the rear surface thereof.

FIG. 18 relates to the light projecting unit 20 and shows an example where the additional element holder 210 is coupled to the main element holder 202 thereby to constitute the sixteen optical axes. The main element holder 202 is provided at the one end portion thereof with the receiving hole 214. When the additional element holder 210 is moved in a direction substantially perpendicular to the arrangement direction of the optical axis relative to the main element holder 202, the engagement projection 212 of the additional element holder 210 is inserted into the receiving hole 214 of the main element holder 202. Thus, when the engagement projection 212 is fit into the receiving hole 214, the hook 213 of the additional element holder 210 engages with the end edge of the main element holder 202, whereby the mechanical coupling of the additional element holder 210 with respect to the main element holder 202 is completed. The light receiving unit 30 can be arranged in the same manner.

As most understood from FIG. 18, in the aforesaid coupling structure, the main element holder 202 and the additional element holder 210 are coupled to each other by performing the fitting operation between the engagement projection 212 and the receiving hole 214. They can be engaged and disengaged by relatively moving them in the direction perpendicular to the arrangement direction of the optical axes. This constitutes a positioning means which can easily and correctly secure them in accordance with the design to maintain the pitch between the adjacent optical axes of the main element holder 202 and the additional element holder 210. Further, the engagement between the hook 213 and the holder end edge can constitute a positioning means for coinciding the optical axis arrangement axis line of the main element holder 202 with the optical axis arrangement axis line of the additional element holder 210.

The aforesaid matter is not limited to the light projecting unit 20 and can also be applied to the light receiving unit 30, and to the coupling between the additional element holders 210.

In this manner, as to the fixing between the main element holder and the additional element holder and the fixing between the additional element holders within the light projecting unit 20 and the light receiving unit 30, the relative positioning can be performed in a matched state in the arrangement direction of the optical axis through the mechanical fitting between the engagement projection 212 and the receiving hole 214 and the mechanical fitting between the end edge of the holder and the hook 213, whereby the pitch between the optical axes can be kept constant.

Figure 19:
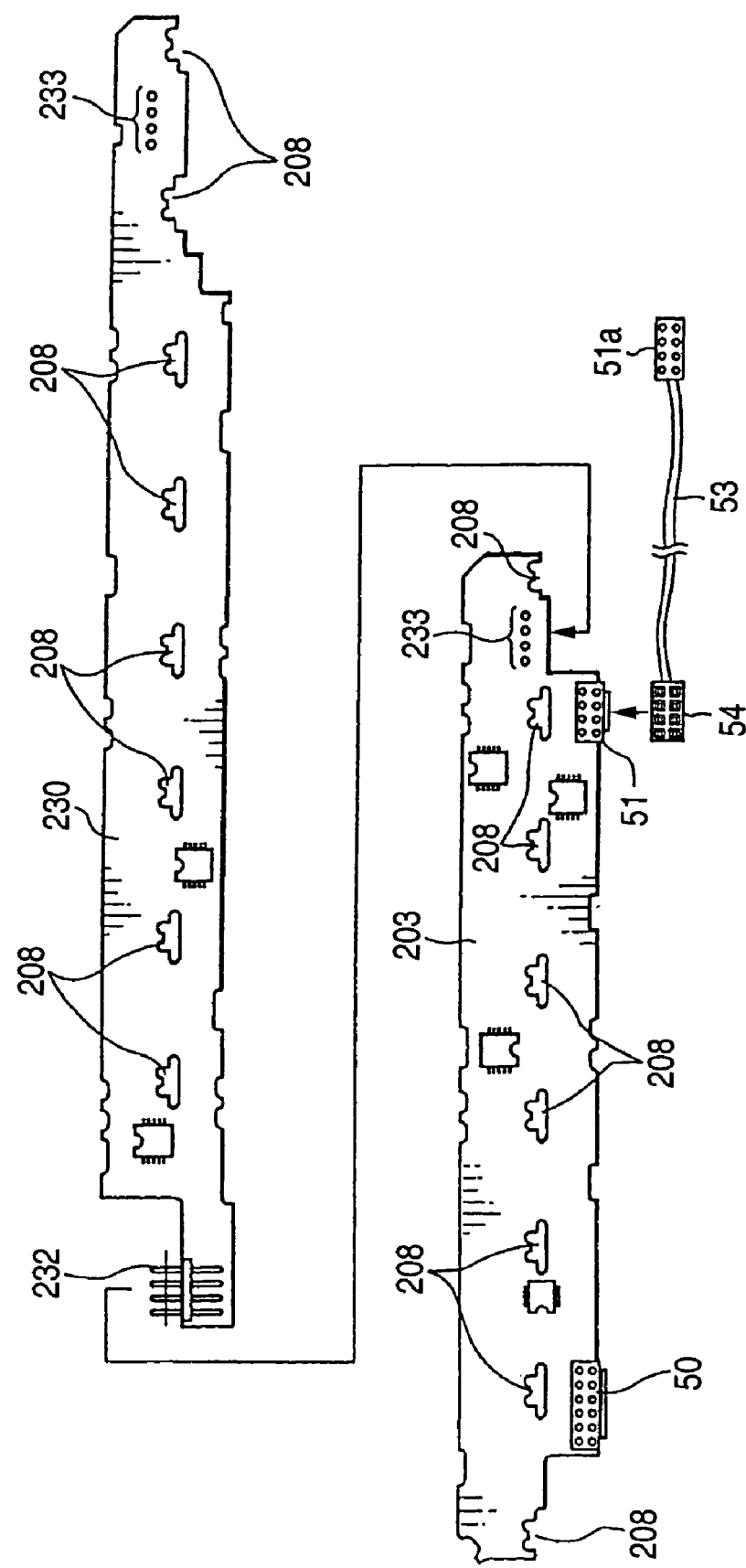
FIG. 19 is a diagram for explaining the electric coupling between the light projecting main board and the light projecting additional board of the light projecting unit.

FIG. 19 relates to the light projecting unit 20 and shows a light projecting additional board 230 constituting an additional unit together with the additional element holder 210. Like the light projecting main board 203, the light projecting additional board 230 is formed with eight through holes or notches 208 through each of which the two coupling terminals 204 of the corresponding light projecting element 201 can pass are formed in a line with the same interval so as to oppose to the rear end surface of the light guide housings 205 of the additional element holder 210. That is, the light projecting additional board 230 is disposed in series with the light projecting main board 203.

The light projecting element 201 attached to each of the light guide housings 205 of the additional element holder 210 is arranged in a manner that the two coupling terminals 204 thereof pass through the though holes or notches 208 and protrude from the rear surface of the light projecting additional board 230. Like the case of the light projecting main board 203, the protrusion ends of the coupling terminals 204 are bent and soldered at the circuit of the light projecting additional board 230.

The light projecting additional board 230 is provided at its one end with a right angle connector 232 and also formed at its the other end with a receiving hole 233 for receiving the right angle connector 232 therein. The receiving hole 233 is also provided at the one end of the light projecting main board 203. When the right angle connector 232 of the light projecting additional board 230 is inserted into the receiving hole 233 of the light projecting main board 203, the light projecting additional board 230 is electrically coupled to the light projecting main board 203. Further, the electric coupling among the plural light projecting additional boards 230 can also be performed in the similar manner.

Figure 20:
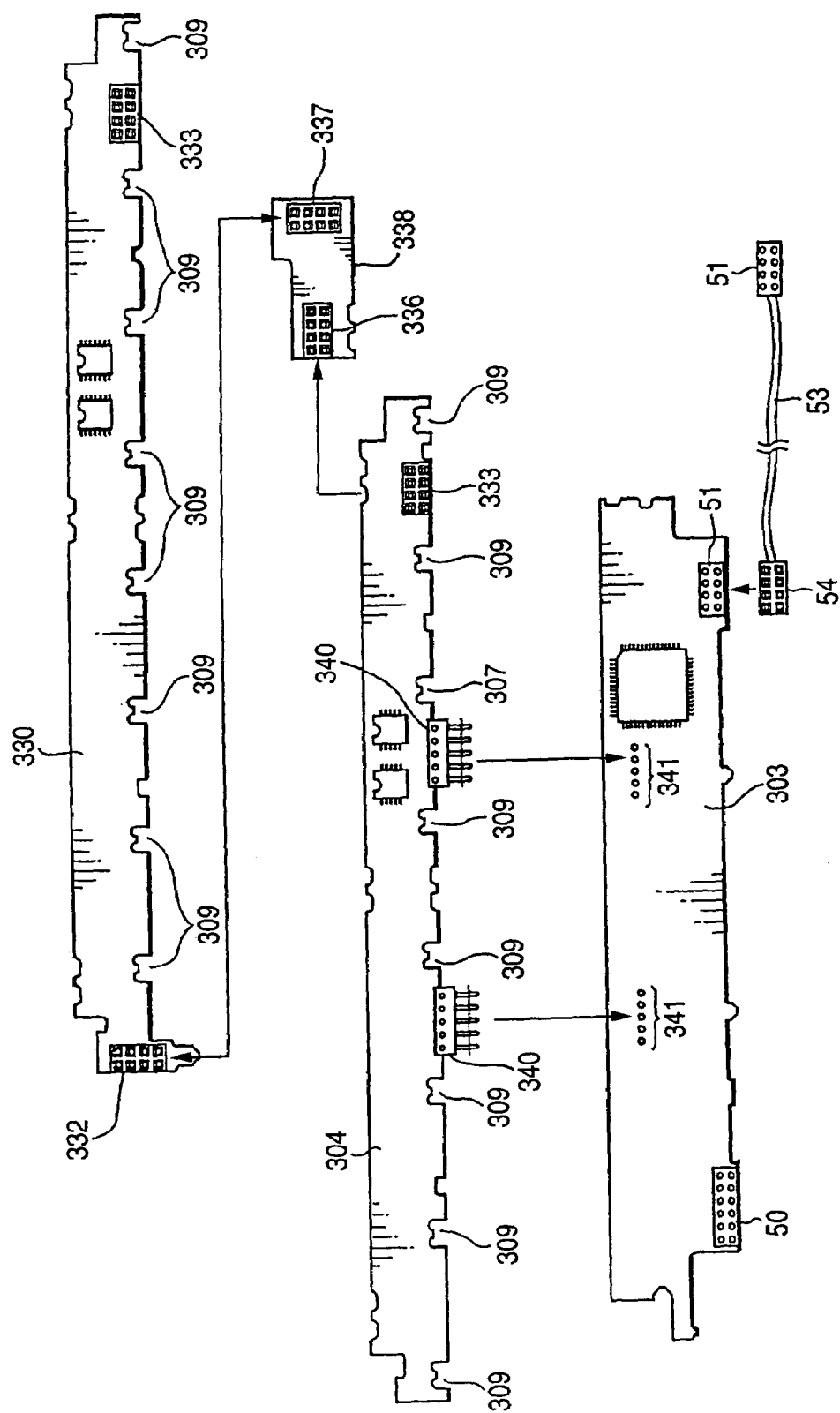
FIG. 20 is a diagram for explaining the electric coupling between the light receiving control board, the light receiving amplifying board and the light receiving additional board of the light receiving unit.

FIG. 20 relates to the light receiving unit 30 and shows a light receiving additional board 330 constituting an additional unit together with the additional element holder. Like the light receiving amplifier board 304, the light receiving additional board 330 is formed with eight notches 309 through each of which the two coupling terminals 305 of the corresponding light receiving element 301 can pass are formed in a line with the same interval so as to be in parallel to the light guide housings of the additional element holder. That is, the light receiving additional board 330 is disposed in series with the light receiving amplifier board 304.

The light receiving element 301 attached to each of the light guide housings of the light receiving additional element holder is arranged in a manner that the two coupling terminals 305 thereof pass through the notches 309 and protrude from the rear surface of the light receiving additional board 330. Like the case of the light receiving amplifier board 304, the protrusion ends of the coupling terminals 305 are bent and soldered at the circuit of the light receiving additional board 330.

The light receiving additional board 330 is provided at its one end with a first board coupling connector 332 and also provided at its the other end with a second board coupling connector 333 disposed in a direction perpendicular to the first board coupling connector 332. The second board coupling connector 333 is also provided at the one end of the light receiving amplifier board 304. The light receiving additional board 330 is electrically coupled to the light receiving amplifier board 304 in a manner that, by using a relay board 338 provided with two relay connectors 336 and 337 disposed perpendicularly to each other, the relay connector 336 of the relay board 338 is mechanically coupled to the second board coupling connector 333 of the light receiving amplifier board 304 and the relay connector 337 is mechanically coupled to the first board coupling connector 332 of the light receiving additional board 330. The electrical coupling between the plural light receiving additional boards 330 can be performed in the similar manner.

The light receiving-control board 303 disposed so as to oppose the rear end surface of the light guide housings 306 of the main element holder 302 is coupled to the light receiving amplifier board 304 disposed in parallel to the light guide housings 306 by inserting two right angle connectors 340 provided separately at the side edge of the light receiving amplifier board 304 into the receiving holes 341 of the light receiving control board 303.

As understood from the drawings, each of the boards 201, 203, 230, 303, 304 and 330 of the light projecting unit 20 and the light receiving unit 30 is provided with the notches at the side edge thereof and so is fixed to the element holder in the positioned state by using the notches and the hook 15 of the element holder.

Figure 21:
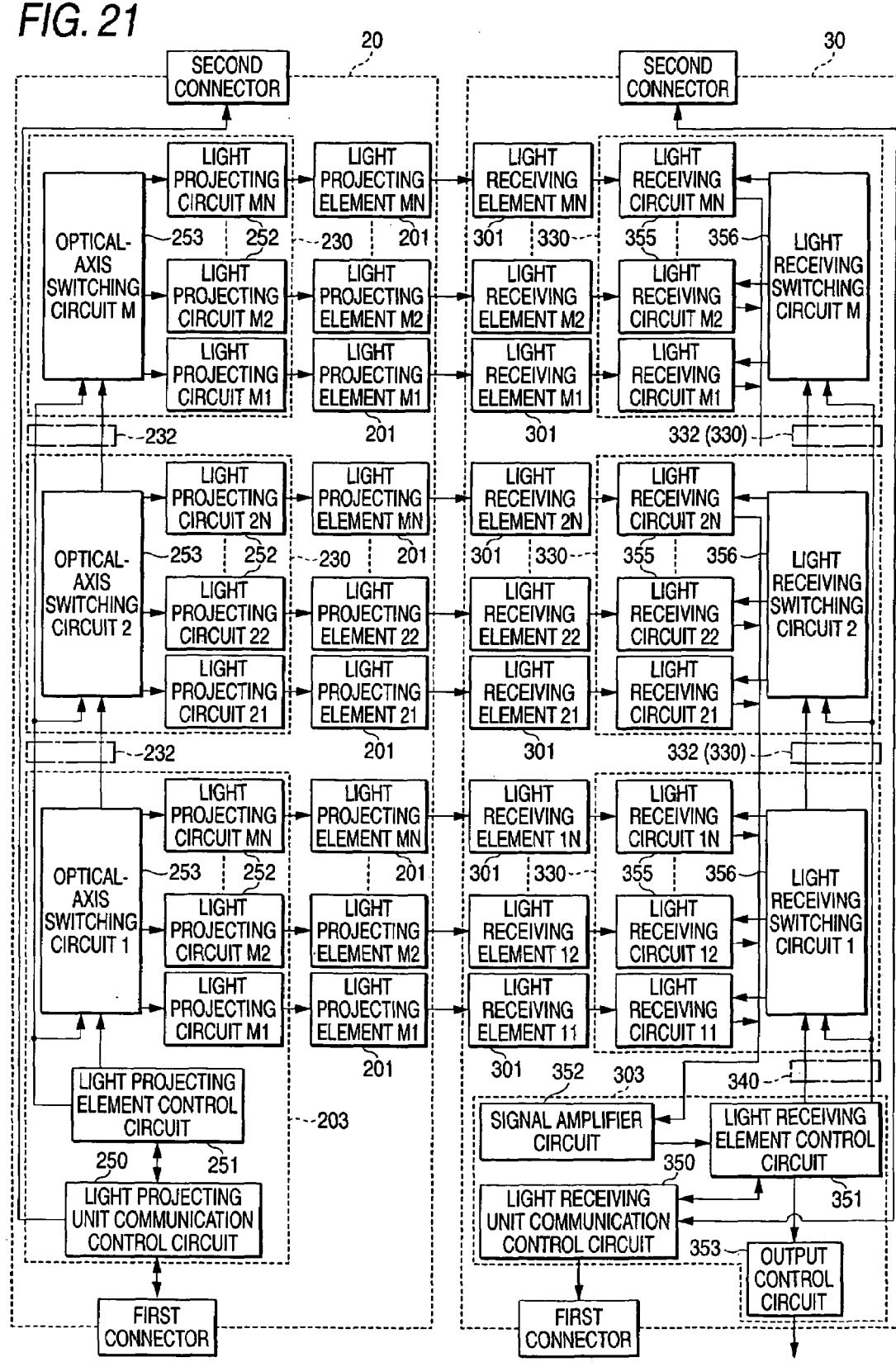
FIG. 21 is a circuit diagram of the multi-optical axis photoelectric sensor containing two additional units therein, for example.

FIG. 21 is a diagram showing the circuit configuration of the light projecting unit 20 and the light receiving unit 30 in which two additional units are incorporated. The light projecting unit 20 includes, on the light projecting main board 203, a light projecting unit communication control circuit 250, a light projecting element control circuit 251, N (eight) light projecting circuits 252, and an optical-axis switching circuit 253. The light projecting element control circuit 251 generates timings for sequentially projecting light from the light projecting elements 201 contained in the light projecting unit 20 in accordance with a clock signal from a clock signal generation circuit, for example. The N (eight) light projecting circuits 252 drive, for example, the eight light projecting elements 201 incorporated within the light projecting main board 203. The optical-axis switching circuit 253 scans these light projecting circuits 252 in a time division manner.

The light projecting additional board 230 of the light projecting unit 20 includes, for example, the N (eight) light projecting circuits 252 for driving, for example, the eight light projecting elements 201 incorporated within the light projecting additional board 230, and the optical-axis switching circuit 253 for scanning these light projecting circuits 252 in a time division manner.

On the other hand, the light receiving unit 30 includes, on the light receiving control board 303, a light receiving unit communication control circuit 350, a light receiving element control circuit 351, a received signal amplifier circuit 352, and an output control circuit 353. The light receiving unit communication control circuit 350 performs the communication between the light projecting unit 20 and the other light receiving unit 30 coupled thereto. The light receiving element control circuit 351 sequentially activates the light receiving elements 301 contained within the light receiving unit 30. The received signal amplifier circuit 352 amplifies a received light signal. The output control circuit 353 processes a signal amplified by the received signal amplifier circuit 352 and inputted into the light receiving element control circuit 351 to thereby determine whether light is shielded or not and outputs a determination result to the outside.

The light receiving amplifier board 304 and the light receiving additional board 330 of the light receiving unit 30 include, for example, N (eight) light receiving circuits 355, and a light receiving switching circuit 356. The N (eight) light receiving circuits 355 drive, for example, the eight light receiving elements 301 incorporated within the light receiving amplifier board 304 and perform the primary amplifying. The light receiving switching circuit 356 scans these light receiving circuits 355 in a time division manner.

As will be understood by those skilled in the art, a circuit directly related to the light receiving elements 301 is incorporated within the light receiving amplifier board 304 in which the light receiving elements 301 are incorporated. On the other hand, in the light receiving control board 303, an output circuit for entire control of the light receiving unit 30 and occupying the relatively large area and a circuit related to the communication with the outside are incorporated. In this manner, since such a reasonable board configuration which is classified functionally is employed, the connectors for electrically coupling the light receiving control board 303 and the light receiving amplifier board 304 can be made minimum. In other words, if all of the aforesaid circuits are incorporated within the single board, this single board would be inevitably large and so the outer size of the light receiving unit 30 would also be inevitably large.

Figure 22:
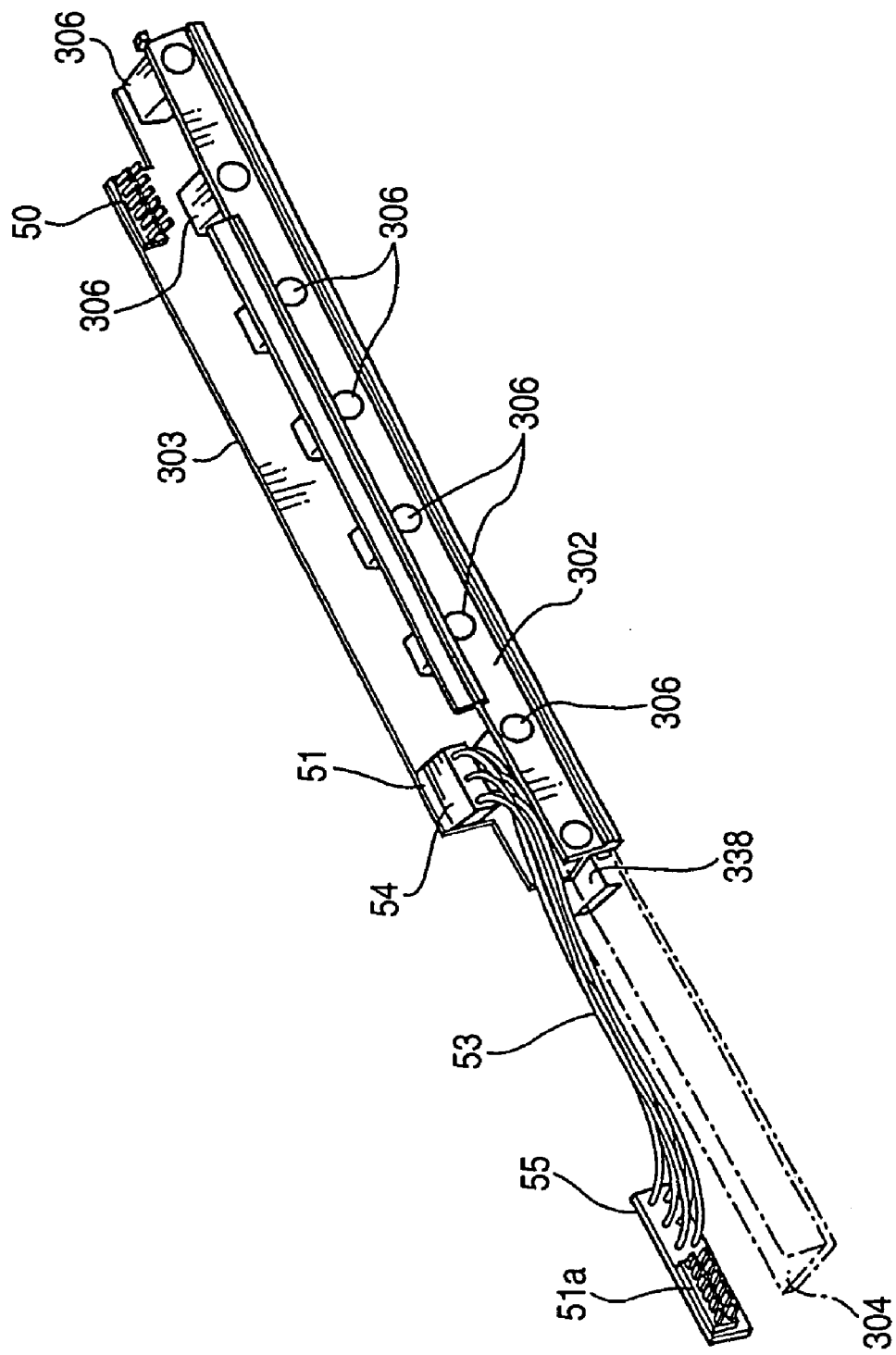
FIG. 22 is a diagram for explaining the configuration for connecting with an external connector by bypassing the additional unit by using an extension harness.

First and second connectors 50, 51 are disposed at the positions facing on the insertion ports 10 (FIG. 1) for receiving the external connectors 8 at the end members 4 disposed at both ends of the multi-optical axis photoelectric sensor 1 (see FIG. 22), respectively. For example, as to the light projecting unit 20, the first and second connectors 50, 51 are disposed at both end portions of the light projecting main board 203, respectively. As to the light receiving unit 30, the first and second connectors 50, 51 are disposed at both end portions of the light receiving control board 303, respectively. Concerning the light projecting unit 20, the first and second connectors 50, 51 are fixed at box-shaped portions 215 (see FIG. 18) positioned at both end portions of the main element holder 202, respectively.

When the multi-optical axis photoelectric sensor 1 incorporates the additional unit therein, the disposing position of the second connector 51 is shifted to the substantially end portion of the multi-optical axis photoelectric sensor 1 by using an extension harness 53. That is, a relay connector 54 to be coupled to the second connector 51 is provided at the one end of the extension harness 53, and an alternative connector 51a is provided at the other end of the extension harness 53. The extension harness 53 is electrically shielded, preferably. The alternative connector 51a serves to fix a supporting board 55 to the box-shaped portion 215 (see FIG. 18) positioned at the end portion of the additional element holder which is disposed at the most end portion.

The multi-optical axis photoelectric sensor 1 is supplied with electric power by using an external cable 12. A synchronous signal and an optical axis state signal are inputted and outputted between the light projecting units 20, between the light receiving units 30 and also between the light projecting unit 20 and the light receiving unit 30. The synchronous signal and the optical axis state signal are processed at the light projecting main board 203 in the light projecting unit 20 and also processed at the light receiving control board 303 in the light receiving unit 30. Thus, it is efficient to bypass the additional board by using the extension harness 53. In other words, if the signals are sent to the alternative connector 51a by using the additional board without using the extension harness 53, the number of the pins of the connectors increases. Further, it becomes necessary to electrically shield a signal line and so an additional area for the signal line is required at the board.

Although the preferred embodiment of the invention has been explained, the pitch between the outermost ends of the main element holder and the additional element holder and the optical element adjacent thereto may be set to be equal to or smaller than the pitch of the optical elements positioned at the center of each of the main element holder and the additional element holder contained in the multi-optical axis photoelectric sensor 1.

Figure 23:
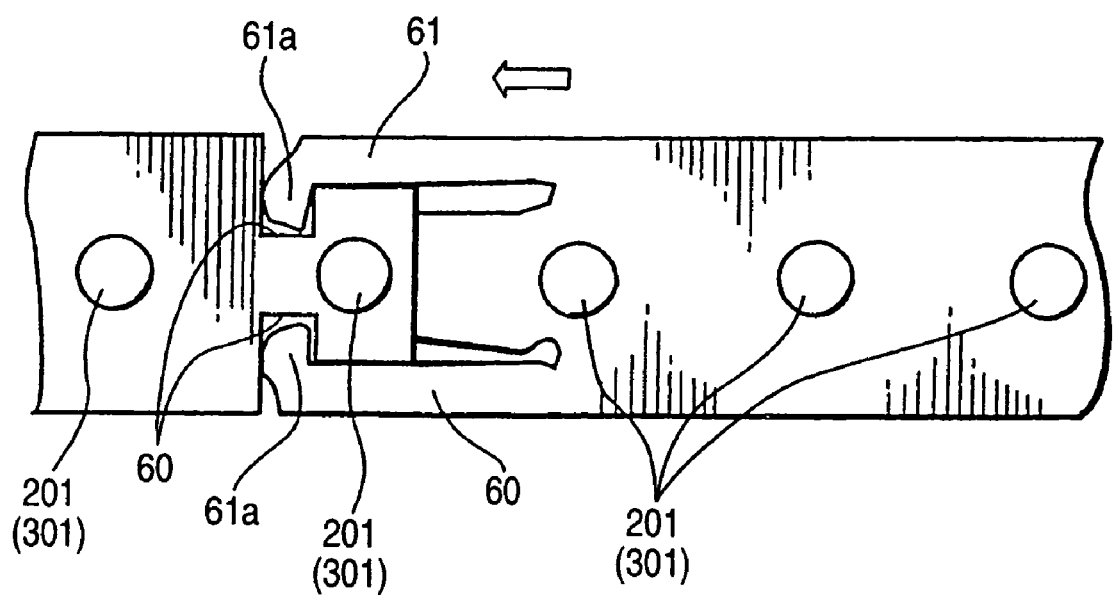
FIG. 23 is a diagram for explaining a modified example of the coupling structure for the holder.

Further, the coupling between the main element holder and the additional element holder and/or the coupling between the additional element holders may be performed in a manner as shown in FIG. 23 so that engagement recess portions 60 are provided at one end of the main element holder or the additional element holder and fingers 61 are provided at the other end thereof, then the holders are moved to each other in the arrangement direction of the optical axes (the optical axis arrangement direction) to engage the retaining members 61a of the fingers 61 with the engagement recess portions 60 to thereby mechanically couple the holders to each other.

Even when employing the structure that the two holders are mechanically coupled to each other by relatively moving the holders in the optical axis arrangement direction, such a positioning means can be configured that can secure the pitch between the optical axes of the adjacent holders correctly in accordance with the design by abutting the end surfaces of the adjacent holders to each other. Further, such a positioning means can be configured that can coincide the optical axis arrangement shaft lines of the adjacent holders to each other by grasping the side surfaces of the holder by means of the side surfaces of the fingers 61, for example.

Further, although in the aforesaid embodiment, each of the basic unit and the additional unit is configured on eight optical axes unit basis, it may be configured on four optical axes unit basis.

What is claimed is:

1. A multi-optical axis photoelectric sensor comprising:
   an elongate casing including an opening along a longitudinal direction;
   a front cover covering the opening of said elongate casing;
   a main element holder disposed within said elongate casing including a plurality of light guide housings disposed along a longitudinal axis of said main element holder, each having an optical element therein, said main element holder having a first engagement portion;
   an additional element holder disposed within said elongate casing including a plurality of light guide housings disposed along a longitudinal axis of said additional element holder, each having an optical element therein, said additional element holder having a second engagement portion capable of mechanically engaging and disengaging said first engagement portion of said main element holder;
   wherein said main element holder and said additional element holder are disposed so that said plurality of light guide housings of said additional element holder disposed along the longitudinal axis of said main element holder, and said plurality of light guide housings of said main element holder disposed along the longitudinal axis of said additional element holder, are disposed in a line adjacent to the opening of said elongate casing when said additional element holder is engaged with said main element holder by said first and second engagement portions within said elongate casing;
   wherein said second engagement portion of said additional element holder and said first engagement portion of said main element holder are engaged by relative movement of at least one of said main element holder and said additional element holder; and
   wherein said first engagement portion of said main element holder is located between at least two of said plurality of light guide housings disposed on said main element holder.

2. A multi-optical axis photoelectric sensor according to claim 1, wherein each of said optical elements has a coupling terminal extending backwardly from a rear surface of said optical element, and said multi-optical axis photoelectric sensor further comprises:
   a main circuit board disposed at a rear surface of said main element holder; and
   an additional circuit board disposed at a rear surface of said additional element holder,
   wherein said main circuit board and said additional circuit board are formed with holes therein and said coupling terminal of one of said optical elements is respectively disposed in one of the holes and respectively contacts at least one of said main circuit board and said additional circuit board.

3. A multi-optical axis photoelectric sensor according to claim 2, wherein said main circuit board and said additional circuit board are electrically coupled to each other through a connector.

4. A multi-optical axis photoelectric sensor according to claim 1, wherein each said optical element in said main element holder and said additional element holder includes a coupling terminal extending outwardly from a side surface of said optical element, and said multi-optical axis photoelectric sensor further comprises:
 a first circuit board disposed parallel to the light guide housings arranged in said main element holder; and
 an additional circuit board disposed parallel to the light guide housings arranged in said additional element holder,
 wherein said first circuit board and said additional circuit board include notches therein and said coupling terminal is respectively disposed in one of the notches and respectively contacts at least one of said first circuit board and said additional circuit board.

5. A multi-optical axis photoelectric sensor according to claim 4, further comprising
 a control board including a control circuit for said multi-optical axis photoelectric sensor, said control board being disposed along a rear surface of said main element holder so that said control board is orthogonal to said first circuit board.

6. A multi-optical axis photoelectric sensor according to claim 4, wherein said first circuit board and said additional circuit board are electrically coupled to each other through a connector.

7. A multi-optical axis photoelectric sensor according to claim 5, wherein said first circuit board and said control board are electrically coupled to each other through a connector.

8. A multi-optical axis photoelectric sensor according to claim 1, wherein said optical element is a light emitting element.

9. A multi-optical axis photoelectric sensor according to claim 1, wherein said optical element is a light receiving element.

10. A multi-optical axis photoelectric sensor according to claim 1, wherein said second engagement portion having a cantilever portion, which is projected from one end of said additional element holder, is disposed in said first engagement portion of said main element holder.

11. A multi-optical axis photoelectric sensor according to claim 1, wherein said second engagement portion of said additional element holder is located between at least two of said plurality of light guide housings disposed along the longitudinal axis of said additional element holder.

12. A multi-optical axis photoelectric sensor comprising:
 an elongate casing including an opening along a longitudinal direction;
 a front cover covering the opening of said elongate casing;
 a main element holder disposed within said elongate casing including a plurality of light guide housings disposed along a longitudinal axis of said main element holder, each having an optical element therein, said light guide housings being arranged to allow light to pass through a substantially planar surface of said main element holder, said main element holder having a first engagement portion;
 an additional element holder disposed within said elongate casing including a plurality of light guide housings disposed along a longitudinal axis of said additional element holder, each having an optical element therein, said light guide housings being arranged to allow light to pass through a substantially planar surface of said additional element holder, said additional element holder having a second engagement portion capable of mechanically engaging and disengaging said first engagement portion of said main element holder;
 wherein said main element holder and said additional element holder are disposed so that said substantially planar surface of said main element holder disposed along the longitudinal axis of said additional element holder, and said substantially planar surface of said additional element holder disposed along the longitudinal axis of said main element holder, are disposed in a common plane adjacent to the opening of said elongate casing when said additional element holder is engaged with said main element holder by said first and second engagement portions within said elongate casing;
 wherein said second engagement portion of said additional element holder and said first engagement portion of said main element holder are engaged by relative movement of at least one of said main element holder and said additional element holder; and
 wherein said first engagement portion of said main element holder is located between at least two of said plurality of light guide housings disposed on said main element holder.

13. A multi-optical axis photoelectric sensor according to claim 12, wherein said second engagement portion having a cantilever portion, which is projected from one end of said additional element holder, is disposed in said first engagement portion of said main element holder.

14. A multi-optical axis photoelectric sensor according to claim 12, wherein said second engagement portion of said additional element holder is located between at least two of said plurality of light guide housings disposed along the longitudinal axis of said additional element holder.

15. A multi-optical axis photoelectric sensor comprising:
 a first elongate casing including an opening along a longitudinal direction;
 a front cover covering the opening of said first elongate casing;
 a first main element holder disposed within said first elongate casing including a plurality of light guide housings disposed along a longitudinal axis of said first main element holder, each having an optical projecting element therein, said first main element holder having a first engagement portion;
 a first additional element holder disposed within said first elongate casing including a plurality of light guide housings disposed along a longitudinal axis of said first additional element holder, each having an optical projecting element therein, said first additional element holder having a second engagement portion capable of mechanically engaging and disengaging said first engagement portion of said first main element holder;
 wherein said first main element holder and said first additional element holder are disposed so that said plurality of light guide housings of said first additional element holder disposed along the longitudinal axis of said first main element holder, and said plurality of light guide housings of said first main element holder disposed along the longitudinal axis of said first additional element holder, are disposed in a first line adjacent to the opening of said first elongate casing when said first additional element holder is engaged with said first main element holder by said first and second engagement portions within said first elongate casing, said multi-optical axis photoelectric sensor further comprises:

wherein said second engagement portion of said first additional element holder and said first engagement portion of said first main element holder are engaged by relative movement of at least one of said first main element holder and said first additional element holder;

wherein said first engagement portion of said first main element holder is located between at least two said plurality of light guide housings disposed along the longitudinal axis of said first main element holder;

a second elongate casing including an opening along a longitudinal direction;

a second front cover covering the opening of said second elongate casing;

a second main element holder disposed within said second elongate casing including a plurality of light guide housings disposed along a longitudinal axis of said second main element holder, each having an optical receiving element therein, said second main element holder having a third engagement portion;

a second additional element holder disposed within said second elongate casing including a plurality of light guide housings disposed along a longitudinal axis of said second additional element holder, each having an optical receiving element therein, said second additional element holder having a fourth engagement portion capable of mechanically engaging and disengaging said third engagement portion of said second main element holder;

wherein said second main element holder and said second additional element holder are disposed so that said plurality of light guide housings of said second additional element holder disposed along a longitudinal axis of said second main element holder, and said plurality of light guide housings of said second main element holder disposed along a longitudinal axis of said second additional element holder, are disposed in a second line adjacent to the opening of said second elongate casing when said second additional element holder is engaged with said second main element holder by said third and fourth engagement portions within said second elongate casing;

wherein said fourth engagement portion of said second additional element holder and said third engagement portion of said second main element holder are engaged by relative movement of at least one of said second main element holder and said second additional element holder; and wherein said third engagement portion of said second main element holder is located between at least two of said plurality of light guide houses disposed on said second main element holder.

16. A multi-optical axis photoelectric sensor according to claim 15, wherein said second engagement portion having a cantilever portion, which is projected from one end of said first additional element holder, is disposed in said first engagement portion of said first main element holder.

17. A multi-optical axis photoelectric sensor according to claim 15, wherein said second engagement portion of said first additional element holder is located between at least two of said plurality of light guide housings disposed along the longitudinal axis of said first additional element holder.

18. A multi-optical axis photoelectric sensor according to claim 15, wherein said fourth engagement portion having a cantilever portion, which is projected from one end of said second additional element holder, is disposed in said third engagement portion of said second main element holder.

19. A multi-optical axis photoelectric sensor according to claim 15, wherein said fourth engagement portion of said second additional element holder is located between at least two of said plurality of light guide housings disposed along the longitudinal axis of said second additional element holder.

* * * * *